Jan. 25, 1938.    J. C. WOODFORD    2,106,686
LOCATING, LOCKING, AND INDICATING MEANS FOR A SHIFTABLE GEAR
Filed Oct. 31, 1934    13 Sheets-Sheet 1
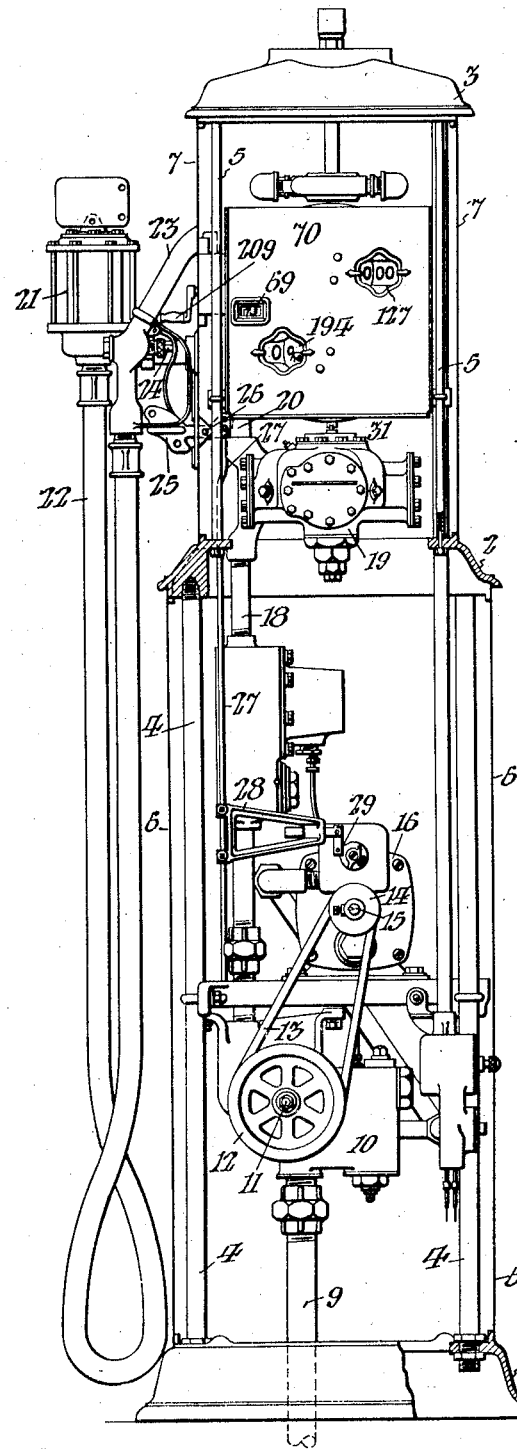
FIG. I.
INVENTOR:
JOSEPH C. WOODFORD,
BY
Attorney.

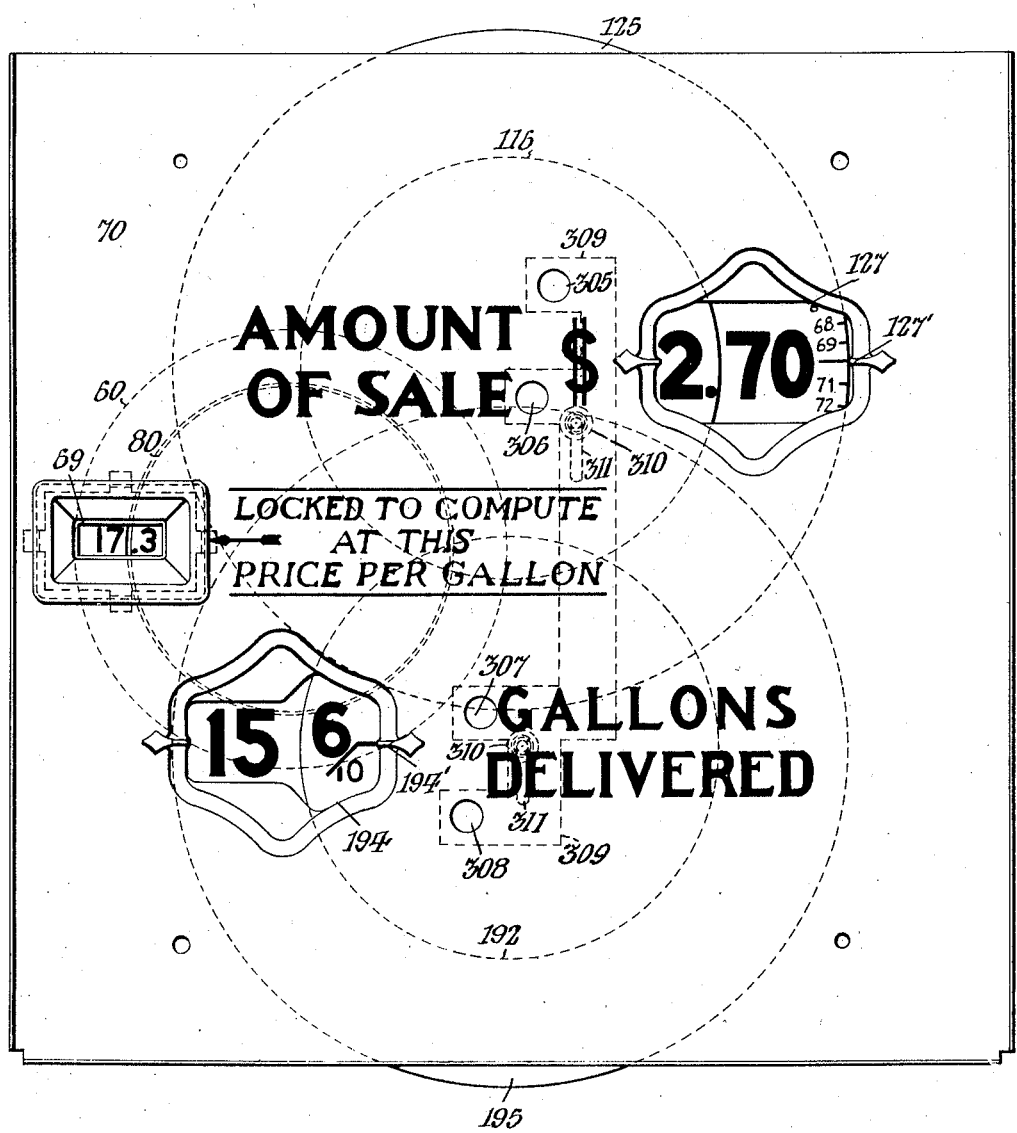

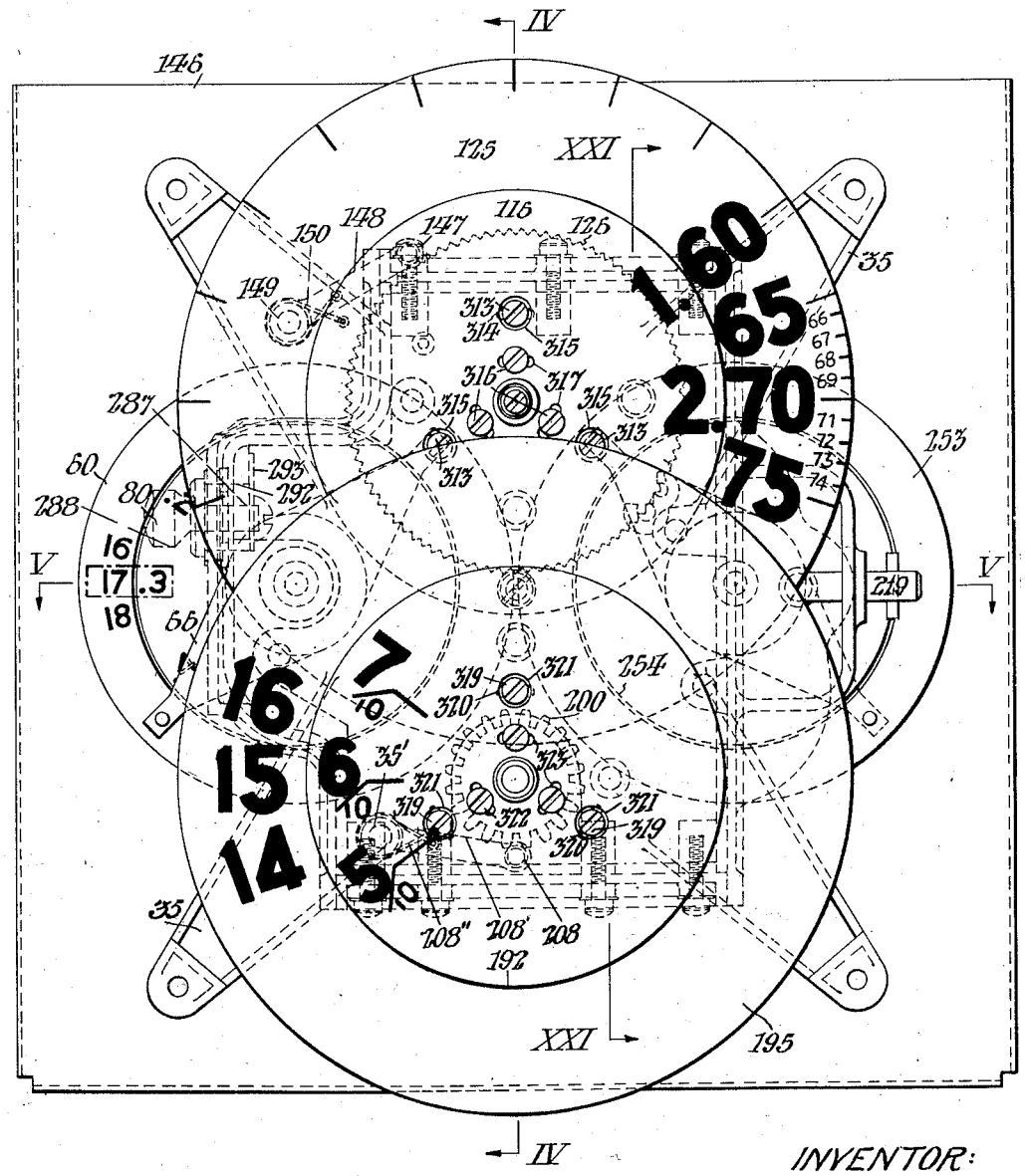

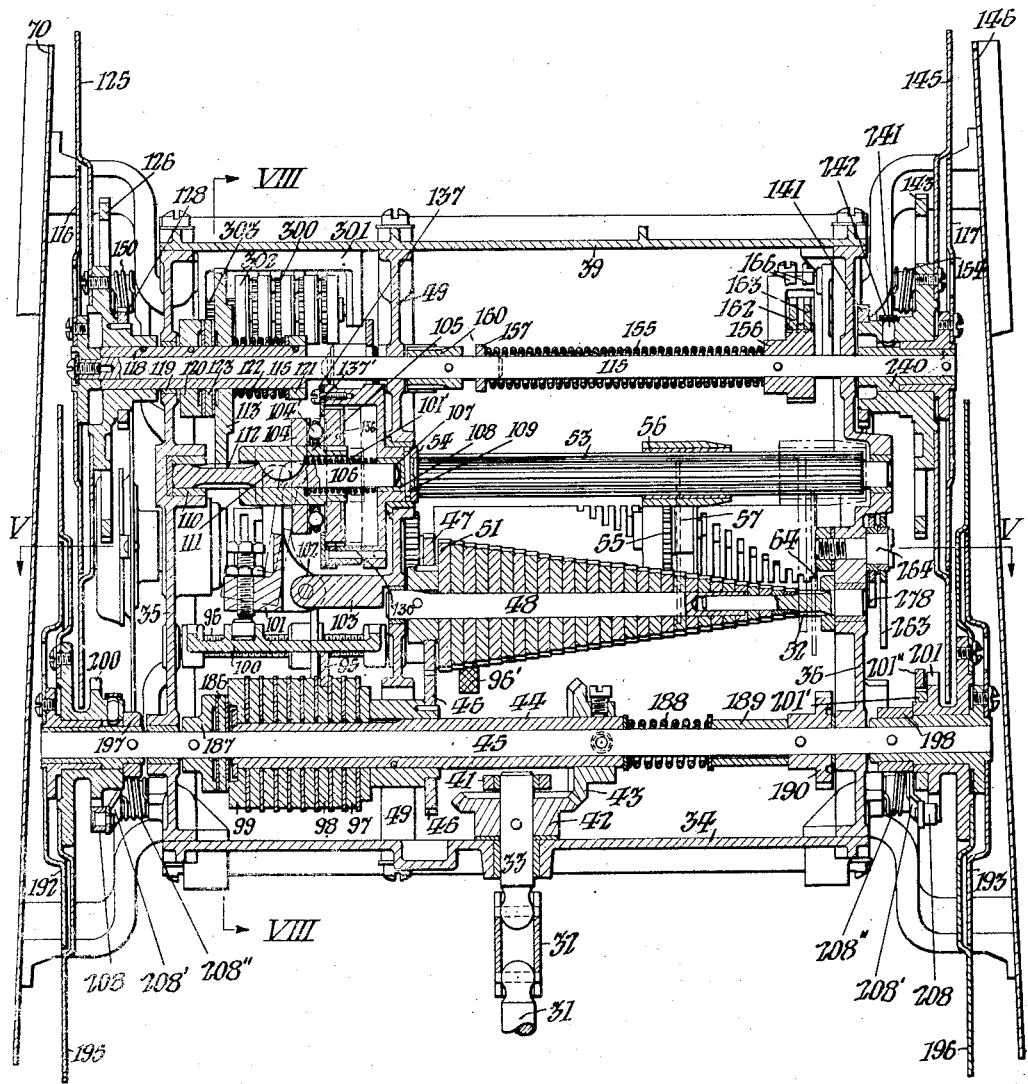

Jan. 25, 1938.  J. C. WOODFORD  2,106,686
LOCATING, LOCKING, AND INDICATING MEANS FOR A SHIFTABLE GEAR
Filed Oct. 31, 1934   13 Sheets-Sheet 5
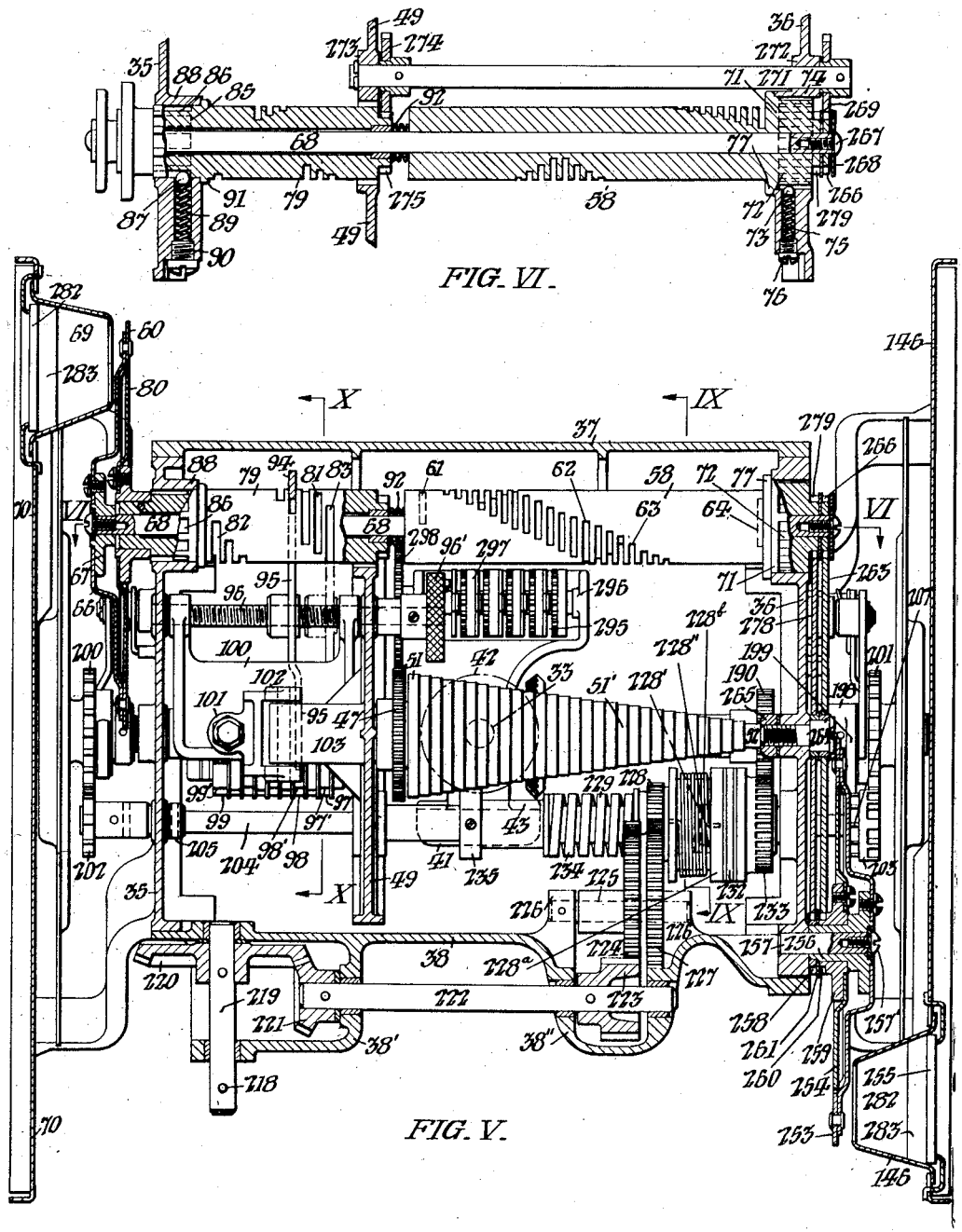
FIG. VI.
FIG. V.
INVENTOR:
JOSEPH C. WOODFORD,
BY
Attorney.

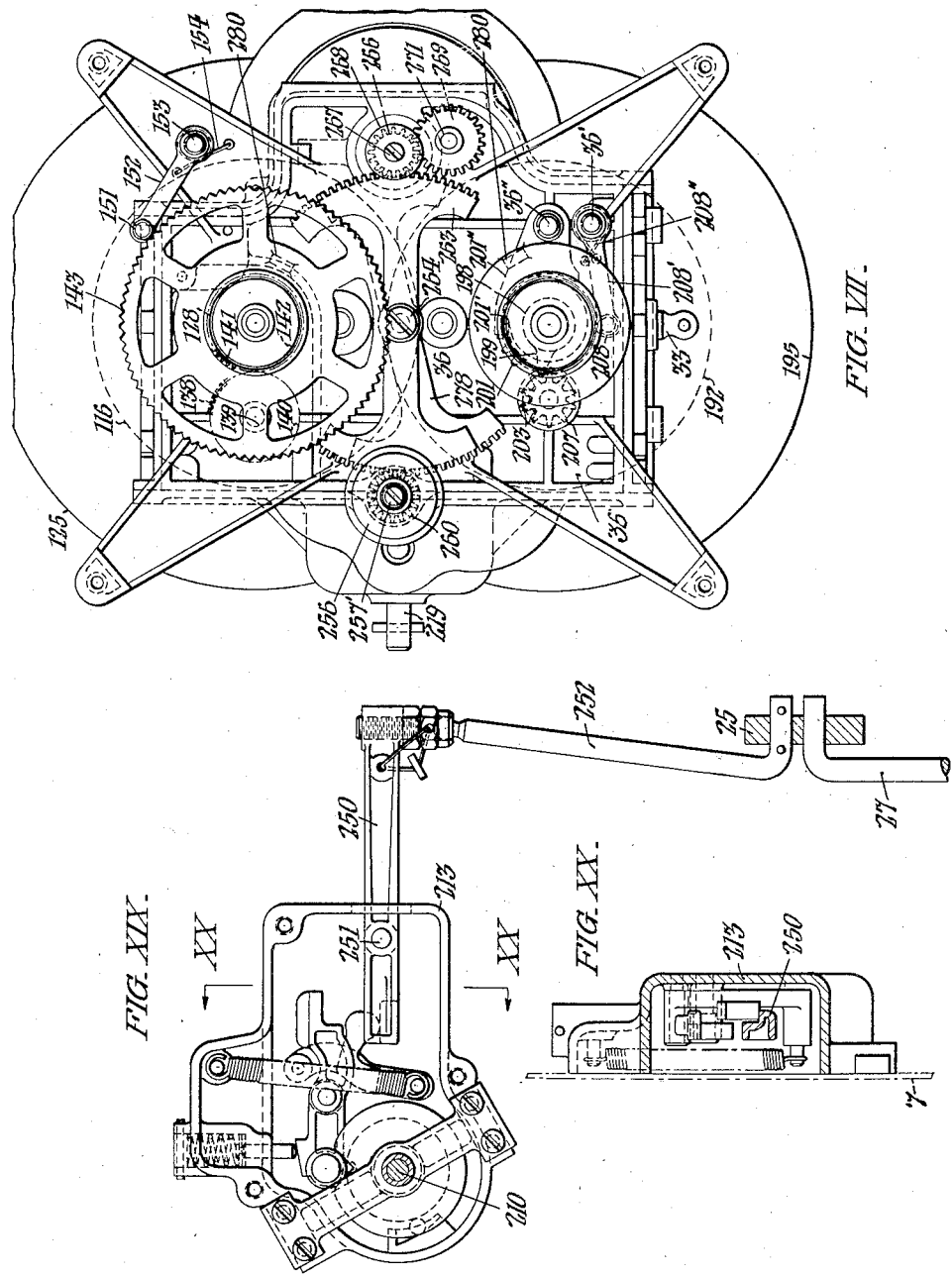

Jan. 25, 1938.    J. C. WOODFORD    2,106,686
LOCATING, LOCKING, AND INDICATING MEANS FOR A SHIFTABLE GEAR
Filed Oct. 31, 1934    13 Sheets-Sheet 7
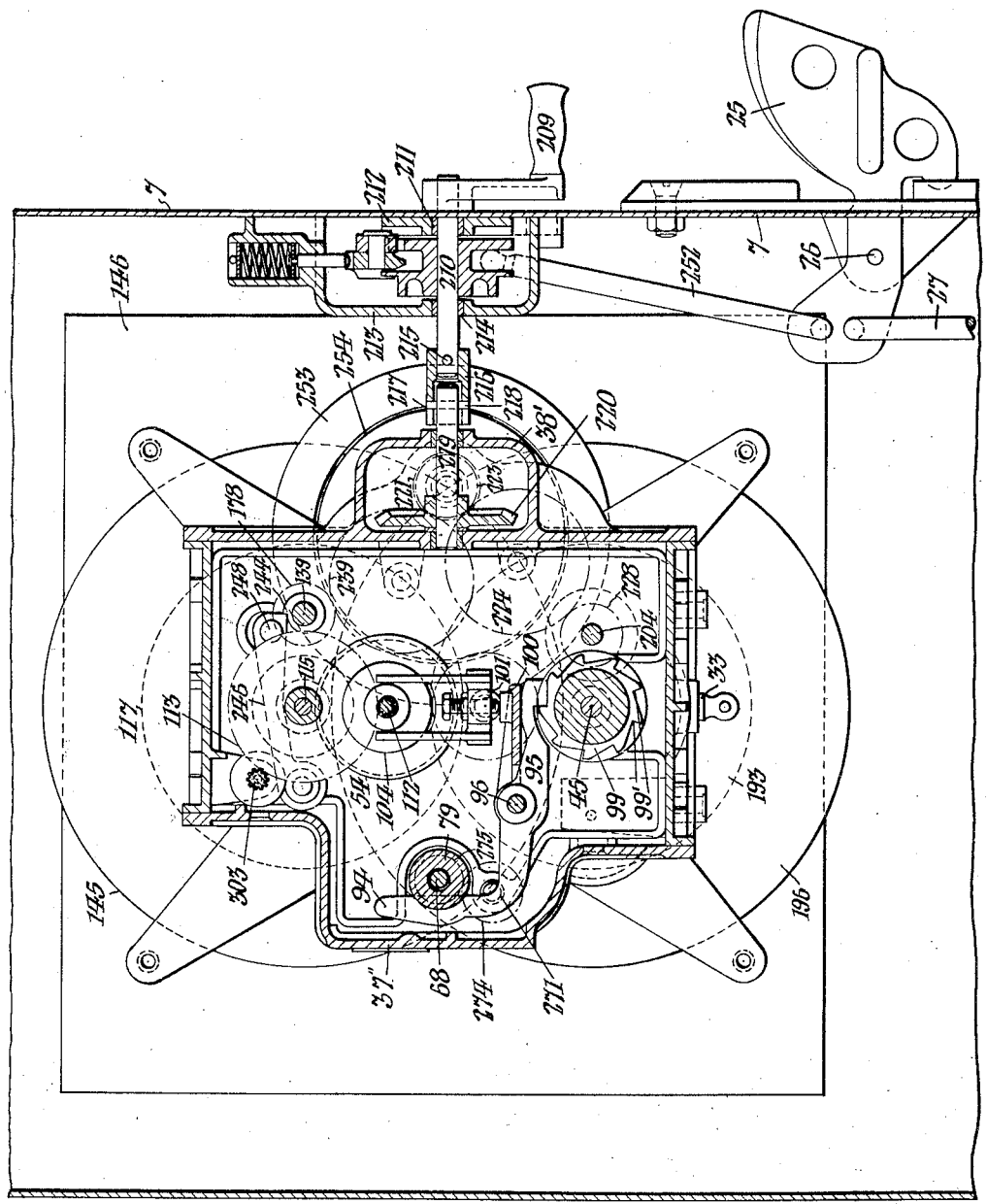
FIG. VIII.
INVENTOR:
JOSEPH C. WOODFORD,
BY Jan. 25, 1938.   J. C. WOODFORD   2,106,686
LOCATING, LOCKING, AND INDICATING MEANS FOR A SHIFTABLE GEAR
Filed Oct. 31, 1934   13 Sheets—Sheet 8
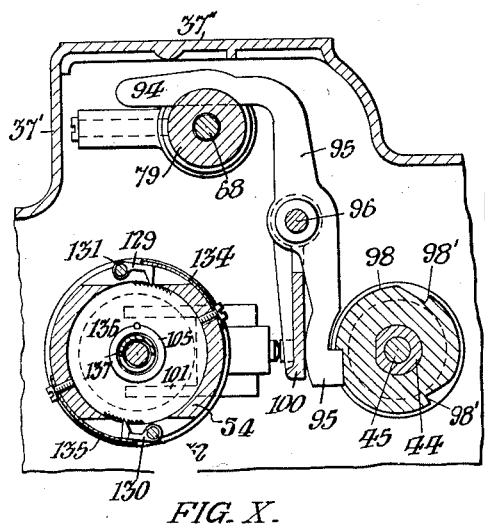
FIG. X.
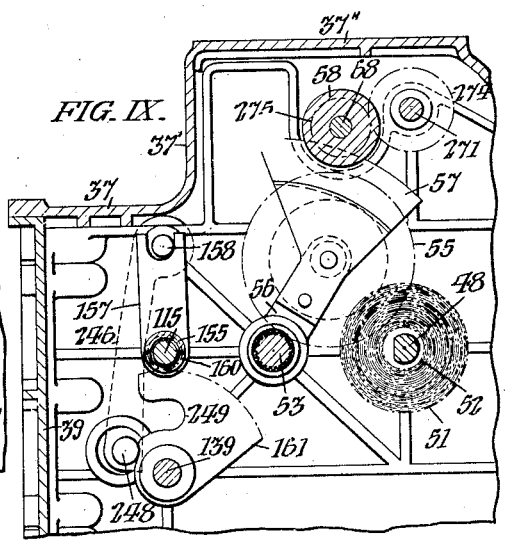
FIG. IX.
FIG. XI.
FIG. XII.
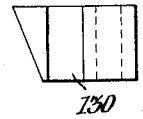
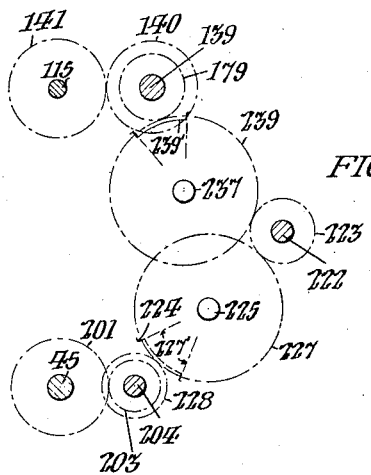
FIG. XXII.
INVENTOR:
JOSEPH C. WOODFORD,
BY
Attorney

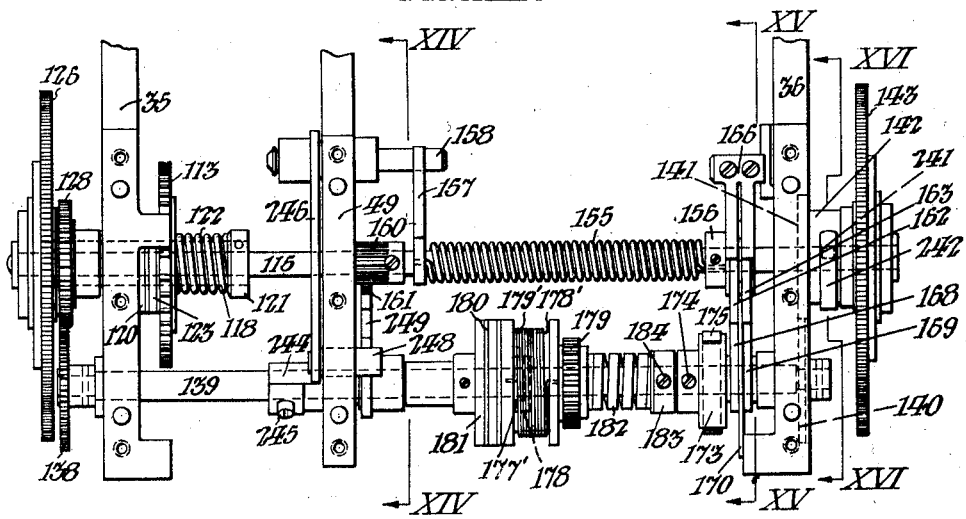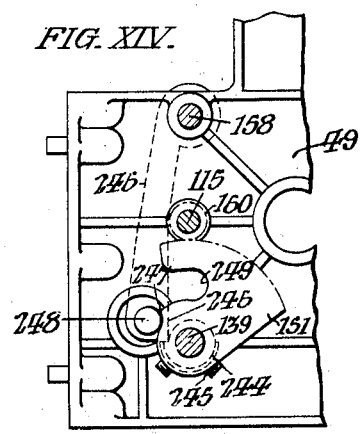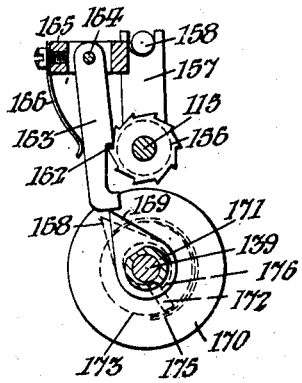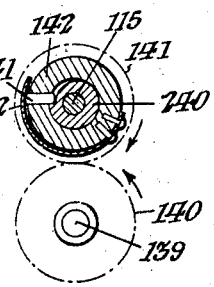

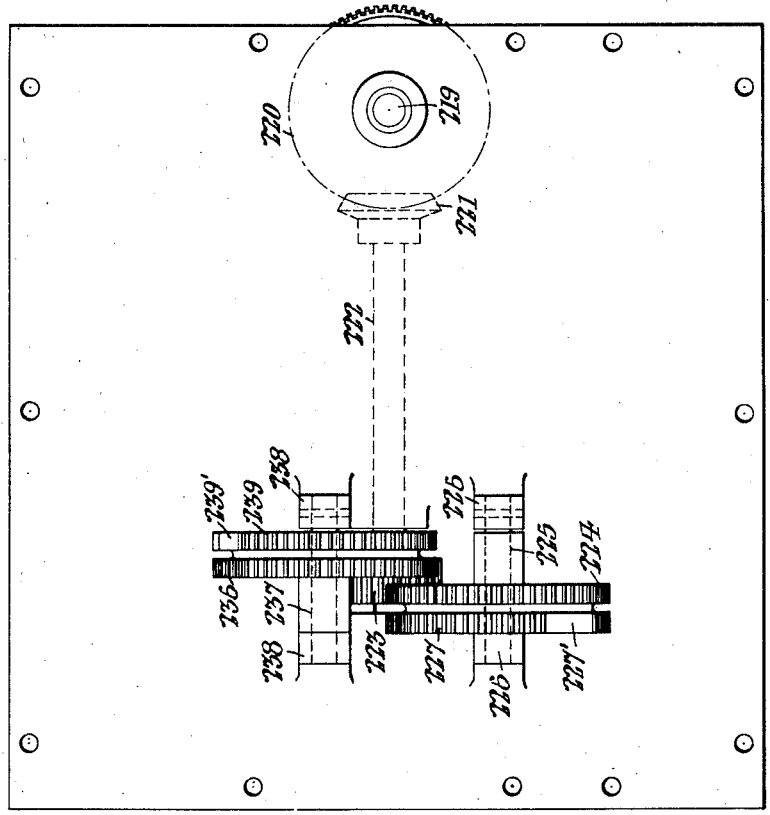
FIG. XVII.
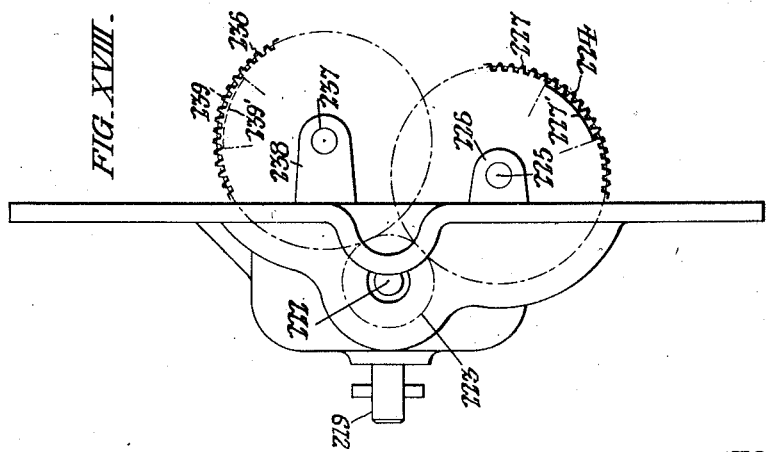
FIG. XVIII.
INVENTOR:
JOSEPH C. WOODFORD,
BY

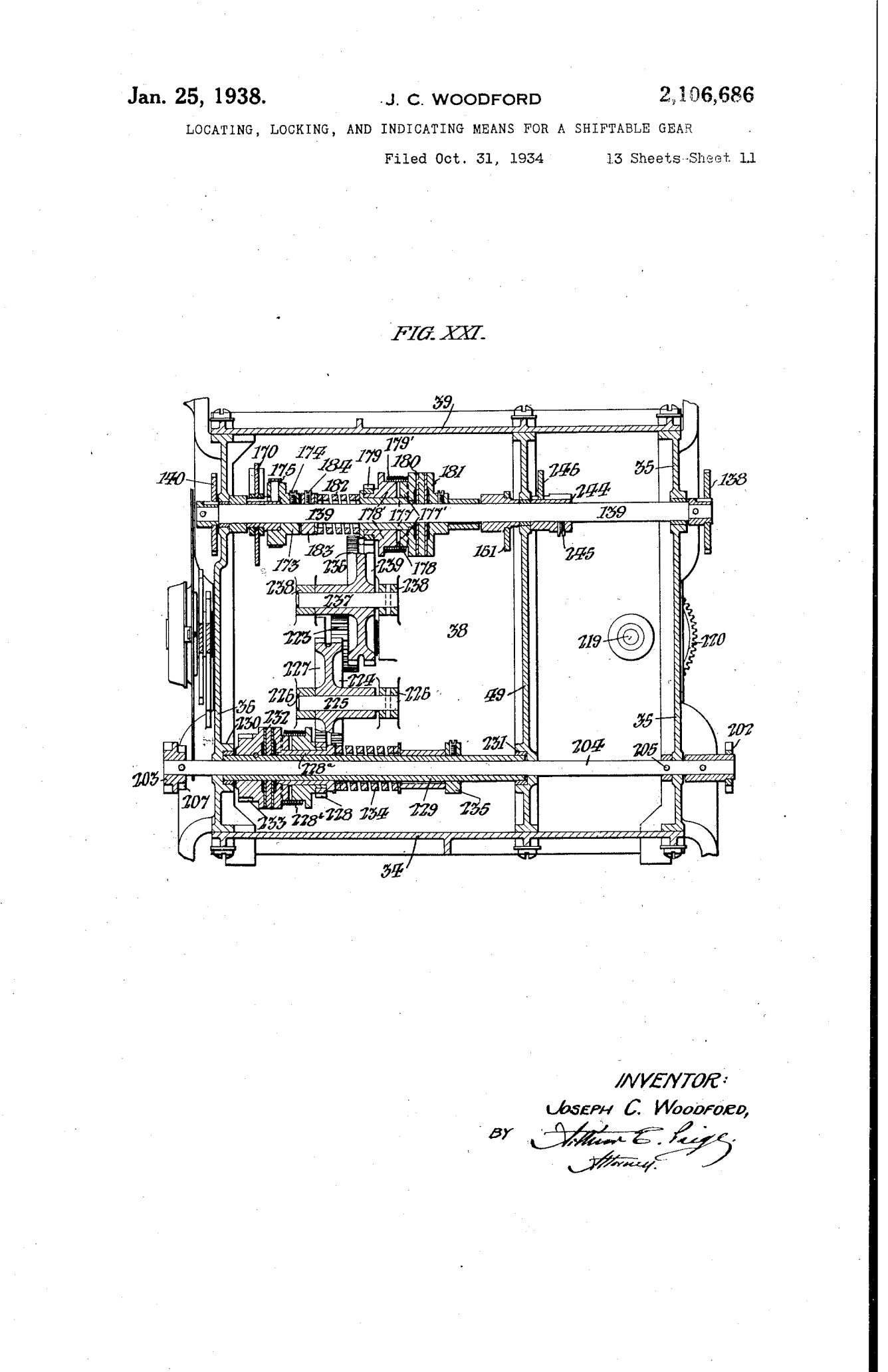

FIG. XXI.

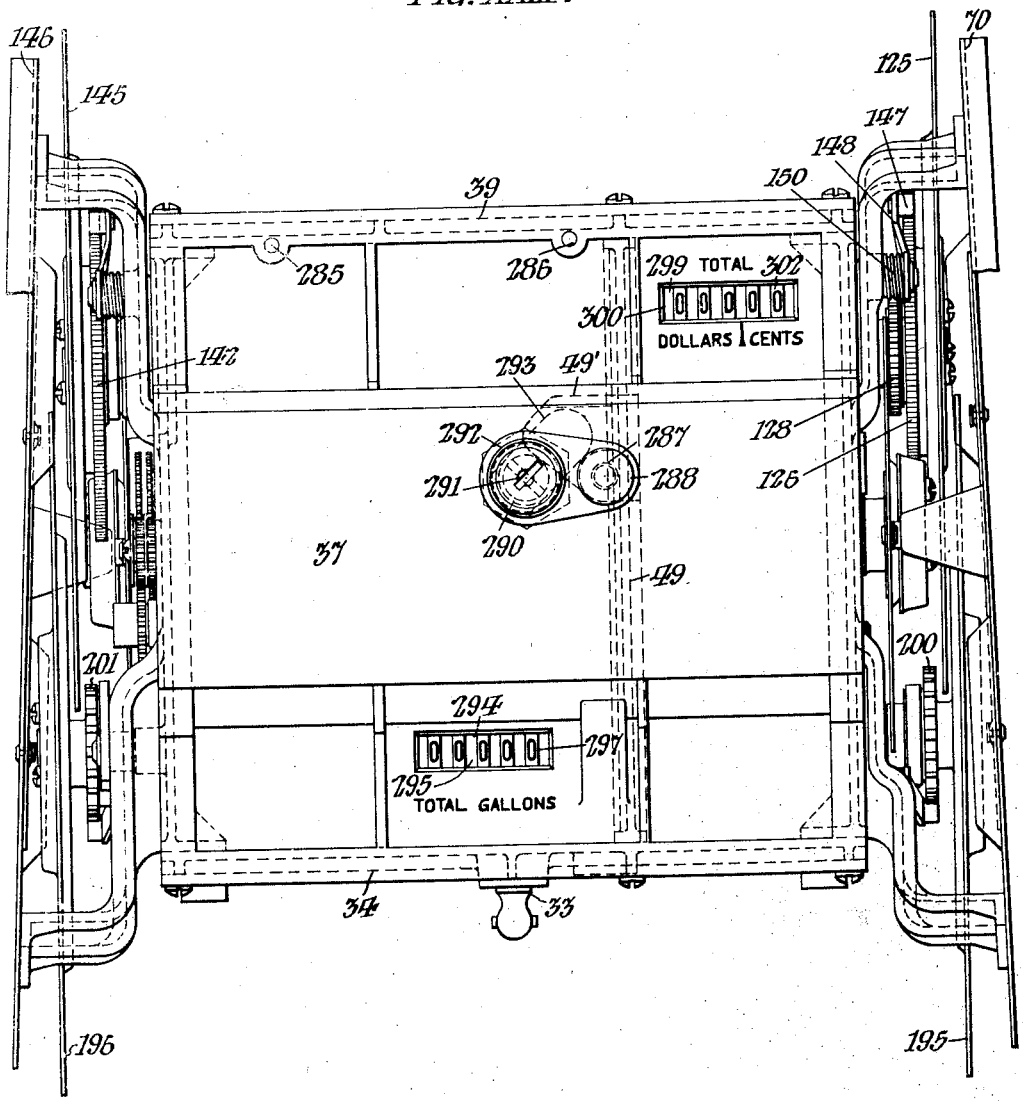

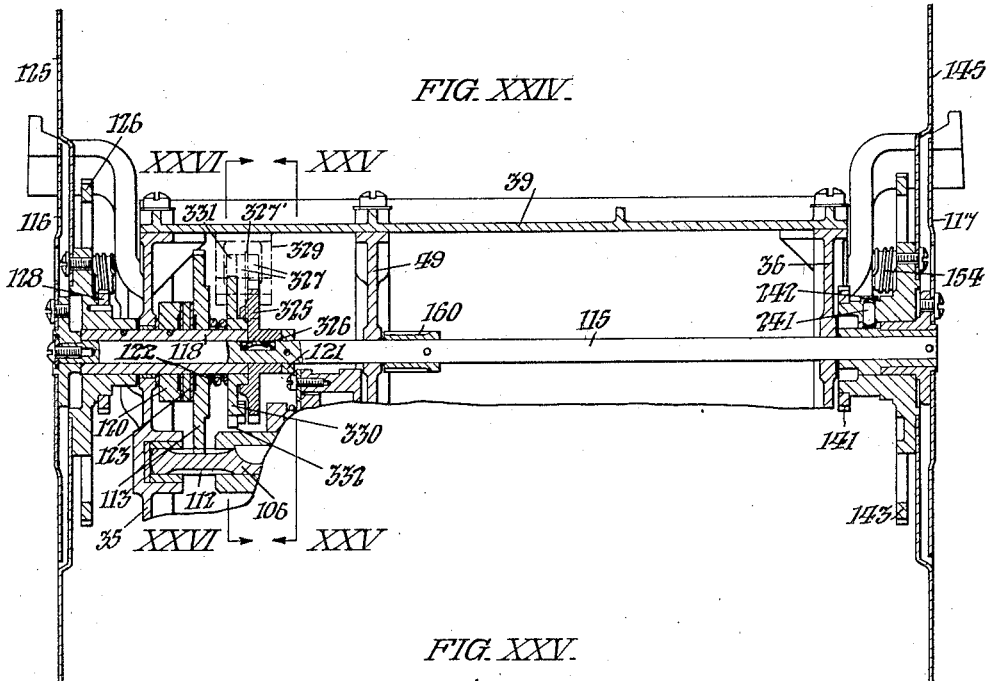

Patented Jan. 25, 1938

2,106,686

UNITED STATES PATENT OFFICE 2,106,686

LOCATING, LOCKING, AND INDICATING MEANS FOR A SHIFTABLE GEAR

Joseph C. Woodford, Haverford, Pa., assignor to John Wood Manufacturing Company, Inc., Conshohocken, Pa., a corporation of Delaware Application October 31, 1934, Serial No. 750,805

4 Claims. (Cl. 74—348)

My invention is particularly applicable to metering pumps for dispensing gasolene. The volume of gasolene dispensed is usually measured in gallons and fractions of a gallon and the price thereof varies in fractions of a cent. Therefore, the purpose and effect of my invention is to provide manually variable means for displaying the current price of gasolene and means for not only registering the volume dispensed at each dispensing operation in gallons and fractions of a gallon, but also computing and registering the value of the volume dispensed at each dispensing operation in cents and fractions of a cent.

The principal object and effect of my invention is to provide interlocking means for connecting the price displaying means with the value computing means, so that when said means are interlocked, the value is computed in precise accordance with the price displayed.

In the form of my invention illustrated, the value based upon the whole cents of the price and the value based upon any fraction of a cent of the price are separately automatically computed by different mechanisms, and the product of the computation aggregated automatically in the registration of the value of the volume dispensed; both of said computing mechanisms being operated in conformity with and preferably by rotation of a meter through which the liquid is dispensed.

As hereinafter described, my invention includes the provision of manually rotary indicating means for displaying the price including a rotary member having recesses in its circumference longitudinally spaced with respect to its axis of rotation and adapted to engage the interlocking means for connecting it with the computing mechanism. The computing mechanism includes a conical assemblage of gears of different sizes respectively corresponding with whole cents of the price and the interlocking means for that whole cents computing mechanism includes a movable gear which connects the meter mechanism of the dispensing apparatus with any manually selected one of said conical assemblage of gears. In that embodiment of my invention, I have found it convenient to include means for computing the value of the volume dispensed with reference to the fractional cent portion of the price, consisting of a series of rotary cams respectively corresponding with different numbers of tenths of a cent of the price, which cam computing mechanism is not herein claimed. It is to be understood that any other suitable means may be employed for that purpose.

An advantageous feature of the form of my invention illustrated is that in lieu of the ordinary means of indicating or registering the volume of liquid dispensed, consisting of a circular dial, I provide a panel with three windows therein with registering mechanism operatively related to those windows so as to display at one window entitled "Amount of sale" the value of the liquid dispensed at one operation in cents and fractions of a cent; to display at the second window the price in cents and fractions of a cent at which said "Amount of sale" is computed; and to display at the third window a registration of the volume dispensed in gallons and fractions of a gallon.

My invention includes the various novel features of construction and arrangement hereinafter more definitely specified.

In said drawings, Fig. I is an elevation of a metering pump of the curbstand type, conveniently embodying my invention. Fig. II is an elevation of the panel indicated at the upper portion of Fig. I, for displaying the three groups of figures respectively indicating the volume of liquid dispensed, the price per gallon, and the computed value of the volume dispensed at said price. Fig. III is an elevation of the dials immediately behind the panel shown in Fig. II and carrying the numbers displayed through the three windows of said panel. Fig. IV is a vertical sectional view of the computing and registering mechanism including said dials, taken on the line IV, IV in Fig. III. Fig. V is a plan sectional view of said computing and registering mechanism, taken on the line V, V in Figs. III and IV. Fig. VI is a fragmentary vertical sectional view, taken on the line VI, VI in Fig. V, in the direction of the arrows on said line. Fig. VII is a right hand end elevation of the computing and registering mechanism as shown in Figs. IV and V, but with the dials removed. Fig. VIII is a vertical sectional view, taken on the line VIII, VIII in Fig. IV, in the direction of the arrows on said line. Fig. IX is a fragmentary vertical sectional view, taken on the line IX, IX in Fig. V, in the direction of the arrows on said line, and showing the price interlocking means for the whole cents computing mechanism. Fig. X is a fragmentary vertical sectional view, taken on the line X, X in Fig. V, in the direction of the arrows on said line, and showing the price interlocking means for the fractional computing mechanism. Figs. XI and XII are respectively plan views of the keeper pawl and the driver pawl indicated in Fig. X. Fig. XIII is a fragmentary plan view showing the connections for operating the dollar dials by the cents dials; which dials are in coaxial relation as shown in Fig. III. Fig. XIV is a fragmentary vertical sectional view, taken on the line XIV, XIV in Fig. XIII, in the direction of the arrows on said line. Fig. XV is a fragmentary vertical sectional view, taken on the line XV, XV in Fig. XIII, in the direction of the arrows on said line, showing the escapement for the spring connection between said dollars and cents dials. Fig. XVI is a fragmentary vertical sectional view, taken on the line XVI, XVI in Fig. XIII, showing the spring pressed pawl and one-toothed ratchet connecting the coaxial shafts of said dollars and cents dials. Fig. XVII is an inside elevation of the housing plate shown at the bottom of Fig. V, which carries the set-back gearing. Fig. XVIII is an elevation of said housing plate and gearing as seen from the left hand side of Fig. XVII. Fig. XIX is an outside elevation of the lock casing of the set-back mechanism removed from the outer wall of the pump housing shown in Fig. I which supports it. Fig. XX is a vertical sectional view of said lock casing, taken on the line XX, XX in Fig. XIX. Fig. XXI is a fragmentary irregular vertical sectional view taken on the line XXI, XXI in Fig. III in the direction of the arrows on said line showing parts of the set-back mechanism. Fig. XXII is a diagram, on the same scale as Fig. VIII, indicating the position of the set-back gears shown in Figs. VIII and XVII with reference to the gears of the computing mechanism with which they are adapted to engage when the set-back mechanism is operated. Fig. XXIII is an elevation of the left hand side of the mechanism shown in Figs. II and III. Fig. XXIV is a fragmentary vertical sectional view, on the plane of Fig. IV but showing modified means for connecting the dollars and cents dials. Fig. XXV is a fragmentary vertical sectional view, taken on the line XXV, XXV in Fig. XXIV in the direction of the arrows. Fig. XXVI is a fragmentary vertical sectional view, taken on the line XXVI, XXVI in Fig. XXIV in the direction of the arrows.

Referring to Fig. I, the liquid dispensing apparatus is principally contained in the housing which is adapted to be rigidly mounted upon a pavement or a platform at a curb or driveway and includes three transversely extending cast metal frame members, viz., the base member 1, the intermediate member 2, and the top member 3. Said frame members 1, 2 and 3 are rigidly connected in the vertical relation shown by a columnar frame including the standards 4 connecting the frame member 1 with the frame member 2, and the standards 5 connecting the frame member 2 with the frame member 3. Said housing includes the lower casing section 6 extending between said frame members 1 and 2 and the upper casing section 7 extending between said frame members 2 and 3. Both of said sections 6 and 7 are rectangular tubes of sheet metal with rounded corners.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the armature shaft 15 of the electric motor 16. The liquid is discharged from said pump 10 through the conduit 18 into the flow meter 19 from which it is discharged through the conduit 20 and the sight gage 21 into the flexible dispensing hose 22 which is provided at its free end with the nozzle 23 including the valve 24 which is normally closed but may be opened by the dispensing operator. The hook lever 25 which is fulcrumed at 26 on said casing 7 is provided to support the hose nozzle in idle position, the outer end of said lever being then depressed by the weight of the hose and nozzle. The inner end of said lever 25 is pivotally connected with the vertically reciprocatory rod 27 which carries the bracket 28 for operating the electric switch 29. The arrangement is such that when the outer end of said lever is lowered, as shown, said switch 29 is opened to deenergize said motor 16 and stop the operation of said pump 10, but, when said lever 25 is raised at its outer end, said switch is closed to operate said pump.

Said flow meter 19 includes a rotor which is turned by the passage of liquid therethrough from said conduit 18 to said conduit 20 and has the shaft 31 which makes one revolution for each gallon of liquid passed through said meter. As indicated in Fig. IV, said meter shaft is arranged to operate the computing and registering mechanism above contemplated by means of the coupling 32 which connects said shaft 31 with the shaft 33 and is loose enough to permit said shafts to be slightly out of alinement. Said shaft 33 is journaled in the bottom wall 34 of the computing mechanism housing which includes the opposite end walls 35 and 36, the opposite side walls 37 and 38, and the top wall 39. Said wall 37 is removable, to permit manipulation of said interlocking means, by the operator but is normally secured in the closed position shown, by screw and lock means hereinafter described. Said shaft 33 is also journaled in the bracket 41 extending upwardly from said bottom wall 34 and carries the miter gear 42 engaging the miter gear 43 on the tubular shaft 44 which is mounted to rotate on the solid shaft 45 which is journaled at its opposite ends in said end walls 35 and 36. Said tubular shaft 44 carries the gear 46 which meshes with the gear 47 on the shaft 48, which is journaled in the end wall 36 and in the intermediate partition wall 49. Said gears 46 and 47 are of the same diameter, so that said shaft 48 is turned one revolution by each revolution of said meter shaft 31. Said shaft 48 rigidly carries a conical assemblage of thirty gears including opposite end gears 51 and 52 respectively corresponding with the highest and the lowest price of the fluid dispensed. Said thirty gears may be selectively connected with the long pinion 53, which is rigid in the pawl head 54 by which the dials indicating the "amount of sale" of the liquid dispensed are turned, as hereinafter described.

Such selective connection is effected by the gear 55 which is continually in mesh with said pinion 53 and is carried by the rocker frame 56 so that it may be lifted to and from engagement with selected gears in the conical series 51 to 52. Said frame 56 carries the blade 57 which, in any engaged position, extends as shown in Fig. IX into the interlocking sleeve 58 which is controlled by the whole cents price display dial 60, which may be manually turned by the operator to display the desired price. Said sleeve 58 includes a series of thirty arcuate slots in its periphery of which four are designated respectively 61, 62, 63, and 64. Said series of slots are so disposed in spaced relation circumferentially and axially as to correspond with the numbers on said dial 60 which represent the whole cents of the price and, in the embodiment of my invention illustrated, range from six cents to thirty-five cents. The slots 61 corresponds with the price of thirty-five cents; the slot 62 corresponds with the price of twenty-one cents; the slot 63 corresponds with the price of seventeen cents; and the slot 64 corresponds with the price of six cents. As shown in Figs. III and V, said dial 60 is in fact a ring having the cross plate 66 extending diametrically between the numbers "6" and "35" upon one side and the numbers "20" and "21" upon the other side to support said ring in connection with its axial hub 67 and shaft 68. Interruption of the regular spacing of said numbers by the interposition of the ends of said plate 66 necessitates a corresponding irregularity in the spacing of said slots in said sleeve 58 which is rigidly connected with said shaft 68 so that said sleeve may be turned with said dial 60 to display a selected cents number of the price at the price display window 69, in the panel 70, shown in Fig. II, and at the same time locate the proper slot in the series on said sleeve 58 in position to receive the blade 57 when the gear 55 is in mesh with the proper price gear of the series 51 to 52 on said shaft 48. In the position shown in Fig. IV, said blade is in the slot 63 corresponding with the price of seventeen cents, and thus positions the gear 55 in mesh with the gear 51' on said shaft 48, which gear 51' is the seventeen cent price gear.

Said sleeve 58 has at the right hand end thereof in Fig. V the ratchet head 71 which has a circular series of thirty depressions 72 in its circumference to selectively engage a ball detent 73 which is mounted in the bearing 74 on the housing wall 36 and provided with the spring 75 secured by the cover screw 76 causing said ball to continually frictionally engage said head by engagement with successive depressions 72 therein. The annular abutment flange 77 on said sleeve 58 serves to hold said sleeve in proper axial position by contact with the inner face of said bearing 74.

The similar interlocking sleeve 79 which is controlled by the fractional cent price display dial 80 is mounted to turn freely on the left hand end of said shaft 68 which, as above noted, is rigidly mounted in said sleeve 58. Said dial 80 may be manually turned by the operator to display the desired price. As indicated in Fig. III, said dial 80 has a circular series of nine numerals thereon respectively ".1" to ".9", representing tenths of a cent, for display through said window 69 at the right of the displayed numeral of the dial 60. Said sleeve 79 has a series of ten arcuate slots of which three are marked 81, 82, and 83. The slot 81 corresponds with the fractional cent price of ".1" and the slot 82 corresponds with the fractional cent price of ".9". The slot 83 corresponds with the zero position of said dial between the numerals ".1" and ".9" which position represents ".0" cent, and a zero mark might be included between the last named numerals but is omitted because of its similarity to the numeral ".9" which might be confusing to the operator and customer. Said sleeve 79 has the ratchet head 85 which has a circular series of ten depressions 86 in its circumference to selectively engage a ball detent 87 which is mounted in the bearing 88 on the housing wall 35 and provided with the spring 89 secured by the cover screw 90, causing said ball to continually frictionally engage said head by engagement with successive depressions 86 therein. The annular abutment flange 91 on said sleeve 79 serves to hold said sleeve in proper axial position by contact with the inner face of said bearing 88. Said sleeves 58 and 79 are thrust apart, against said bearings in the walls 35 and 36, by the spring 92 encircling said shaft 68 between said sleeves.

Said slots in the sleeve 79 are adapted to receive the blade 94 carried by the cam lever 95 which is fulcrumed on the screw shaft 96 which engages it as a nut, so that it may be adjusted axially, by turning said shaft by its knob 96', when said blade 94 is disengaged from the sleeve 79. Such disengagement may be effected manually by the operator. Said lever 95 may be thus shifted to cooperate with any one of the series of nine cams, of which three are respectively marked 97, 98, and 99, and which are rigidly mounted upon said sleeve 44, which is turned one revolution by the meter shaft 31 for each gallon of liquid dispensed. Said cams have respectively different numbers of notches corresponding with the different numbers of tenths of a cent, from ".1" to ".9", which they add to the computation, as hereinafter described. For instance, the cam 97 has one notch 97', the cam 98 has three notches 98', and the cam 99 has nine notches 99'.

The knocker plate 100 is carried by said shaft 96, as indicated in Figs. IV and X, between said end wall 35 and the partition wall 49 so that it is capable of rocking movement, to be raised by said cams 97 et seq. and may be lowered, with reference to Figs. IV and VIII, by said lever 95 when the latter is in registry with any notch in said series of nine cams. Said plate 100 is continually in cooperative relation with the short arm of the knocker lever 101 which is fulcrumed at 102 upon the bracket 103 projecting from said partition wall 49 toward said wall 35, as indicated in Fig. IV. The long arm of said lever 101 is bifurcated as indicated in dotted lines in Fig. X, and its free ends bear upon the thrust bearing ring 104 for the balls 104'; which ring is free to turn and slide axially on the sleeve 105, under stress of the knocker spring 101', to advance the value computer one-tenth cent whenever said lever 95 rises from a cam notch. Said sleeve is mounted to axially reciprocate on the shaft 106 which is in coaxial relation with said long pinion 53 and has its inner end journaled in the recess 107 in the reduced cylindrical outer end 108 of said pinion upon which said pawl head 54 is rigidly secured by the tapered pin 109. Said shaft 106 is journaled at its outer end in the bearing 110 on said casing wall 35. Said shaft 106 has the key 111 engaging said sleeve 105 so that turning movement of said sleeve 105 turns said shaft 106 which is cut to form the gear pinion 112 in mesh with the gear 113. Said gear 113 is in coaxial relation with the shaft 115 with which the dollar unit dials 116 and 117 are rigidly connected at its opposite ends, as shown in Fig. IV, but is carried by the tubular shaft 118 which is mounted to turn freely on said shaft 115 and journaled in the bearing 119 in the housing wall plate 35 which supports both shafts at that end. However, said gear 113 is connected with said shaft 118 by friction clutch means to permit said gear 113 to remain stationary while said shaft is turned in the reverse direction to set the value indicating dials back to zero position, as hereinafter described. Such means includes the abutment rings 120 and 121 which are rigidly connected with said shaft 118, and the spring 122 which is compressed between said abutment 121 and said gear 113 to press the latter in frictional engagement with the clutch rings 123 interposed between said gear 113 and the abutment 120. Said tubular shaft 118 has, rigidly connected therewith, the dial 125 graduated with marks, partly indicated in Figs. II and III, indicating one hundred cents. Said shaft 118 also has rigidly connected therewith the detent ratchet wheel 126 by which it is detained, as hereinafter described, with the graduations of said cents dial 125 successively presented in registry with the index window 127 in said panel 70, shown in Fig. II. Said cents dial shaft 118 also carries the gear 128 by which it is connected to cause the dollar dials 116 and 117 to turn, as hereinafter described.

As above described, said shaft 48 carrying the conical assemblage of gears 51 to 52 is turned one revolution for each gallon of liquid dispensed through the meter 19 and in accordance with the gear selected in the conical series from 51 to 52 said long pinion 53 carrying the pawl head 54 turns the latter more or less for each gallon dispensed in accordance with the whole cent price per gallon to which the apparatus has been adjusted, as above described. Said pawl head, which is shown in Figs. IV, VIII, and X, carries two pawls 129 and 130 which, as shown in Fig. X, are respectively pivoted upon pins 131 and 132 in segmental recesses cut in said head 54, so that the ends of said pawls are pressed inward by respective springs 134 and 135 to engage the teeth of the ratchet wheel 136 which is rigidly mounted upon the inner end of said slidable sleeve 105.

When released by said cam lever 95, said sleeve and ratchet may be thrust to the left in Fig. IV by the spring 101', to the limit determined by the stop ring 137 secured at the open end of said pawl head 54 by screws 137'. Said ratchet 136 has one hundred teeth which are parallel with its axis of rotation, and the pawl 129 has its edge also parallel with said axis and said pawl serves as a driving connection between said pawl head 54 and said ratchet to transmit to the pinion 112 the number of revolutions of said pawl head as turned by the whole cent computing mechanism above described. However, said pawl 130 has its edge which engages said ratchet 136 extending at an angle of twenty degrees to said axis so that, when the knocker lever 101 is raised by any crest of the selected fraction of a cent cam, said ratchet 136 is thrust axially with respect to said pawl head 54, (against the pressure of said spring 101') and the tooth of said ratchet then registering with the pawl 130 is thrust in the same direction as the rotation of said pawl head 54 but so as to advance said ratchet 136 with respect to the rotation of said head to the angular extent of one tooth by each such knocking action. In other words, each gallon of liquid dispensed effects one revolution of the cam sleeve 44, and adds to the computation movement imparted to said ratchet 136 from the selected gear of the conical series connected with the pinion 53, an amount determined by the cam selected, for instance, the one-tenth cent cam 97 advances said ratchet but one of its one hundred teeth, whereas, the nine-tenths cent cam 99 advances it nine teeth. Thus there is aggregated in the movement of said ratchet (and the pinion 112, gear 113, and value indicating dials connected therewith) the computed values of the whole cents and fractional cent portions of the price per gallon of the liquid dispensed.

The aggregate movement of the gear 113 effected as above described turns the cents dial 125 counterclockwise in Figs. II and III to indicate at the window 127 in the panel 70 the full value of the liquid dispensed, but, as each revolution of that dial indicates but one hundred cents of such value, I provide means cooperatively connecting said dial 125 with the dollars dial 116 so that each revolution of said cents dial 125 turns the dollars dial 116 to the angular extent from one dollar number to the next thereon. Such means include the gear 128 on the cents dial shaft 118 which, as shown in Fig. XIII, engages the gear 138 on the cents dial connecting shaft 139 which is journaled in said opposite end wall plates 35 and 36. Said shaft 139 carries, adjoining said housing wall 36, the gear 140 engaging the gear 141 on the hub 142 of the ratchet wheel 143 which is the same diameter and has the same number of teeth as the ratchet wheel 126. Said ratchet wheel 143 carries the cents dial 145 which is graduated to indicate one hundred cents like the dial 125. Thus the amount of sale is simultaneously registered and displayed upon opposite sides of the housing and respectively visible through said window 127 in the panel 70 and through a corresponding window in the panel 146 which is precisely like the panel 70.

As shown in Fig. III, said ratchet wheel 126 is detained in each position to which it is shifted so as to accurately successively register its one hundred graduations with respect to the index pointer 127' shown in Fig. II, by the roller 147 carried by the lever 148 which is fulcrumed on the stud 149 projecting from the housing wall plate 35, and pressed toward said ratchet 126 by the spring 150 which encircles the hub of said lever 148 as indicated in Fig. IV, and has one end engaged with said lever and the other with said plate 35. Said ratchet 143 at the opposite end of the housing is similarly engaged by the roller 151 carried by the lever 152 fulcrumed on the stud 153 projecting from the housing plate 36 and pressed toward said ratchet 143 by the spring 154 which encircles the hub of said lever 152, as indicated in Fig. IV, and has one end engaged with said lever and the other with said plate 36.

Said shaft 115 with which the dollar unit dials 116 and 117 are rigidly connected at its opposite ends, as shown in Fig. IV, is continually stressed to turn it counterclockwise in Fig. III by means of the helical spring 155 shown in Fig. XIII encircling said shaft and having its right hand end engaged with the hub of the ratchet wheel 156 shown in Figs. XIII and XV, which is pinned to said shaft. Said spring 155 has its left hand end engaged with the lever 157 which is fulcrumed on said shaft 115 and has its outer end continually engaged with the stud 158 on the intermediate frame plate 49. Said spring is initially subjected to such torque as to enable it to turn said shaft 115 a complete revolution, with such force as to continually hold it in proper position. Said spring is rewound to its original tension by the operation of setting back the registering mechanism to its zero position, as hereinafter described; by means of the gear pinion 160 which is rigidly connected with said shaft 115 and in mesh with the sectoral gear 161 which is loose on said cents dial connecting shaft 139. Said spring 155 is permitted to advance said dollars dials 116 and 117 by means of the escapement illustrated in Figs. IV, XIII, and XV including said ratchet wheel 156. Said ratchet wheel has, in cooperative relation therewith, the two escapement pawls 162 and 163 which are both fulcrumed on the pin 164 in the bracket 165 rigidly connected with said housing wall plate 36, as indicated in Fig. XIII. However, as indicated in Fig. XV, the pawl 163 is shorter from its fulcrum to its edge engaging said ratchet 156 than the pawl 162. Both of said pawls are pressed into cooperative relation with said ratchet 156 by the spring 166, the respective bifurcations of which independently press upon said pawls.

Said pawls 162 and 163 are tripped in succession by respective tappets 168 and 169. Said tappets are rigidly connected with each other and with the circumferential flange 170 by the sleeve 171 which is loose on said shaft 139 but operatively connected to be turned by said shaft counterclockwise in Fig. XV by means of the pin pawl 172 carried by the collar 173 which is rigidly connected with said shaft 139 by the set screw 174 shown in Fig. XIII. Said pin pawl 172 is continually stressed inward by the spring 175 shown in Figs. XIII and XV which is connected at one end to said collar 173; so that said pin pawl engages the single toothed ratchet 176, as shown in Fig. XV, to normally turn said tappets 168 and 169 counterclockwise as in Fig. XV as if they were rigidly connected with said shaft 139. That ratchet and pawl connection between said shaft 139 and said tappets 168 and 169 is merely to permit said shaft to be turned clockwise independently of said tappets during the resetting operation which winds said spring 155, because said tappets cannot be turned in that direction, being stopped by contact of the tappet 169 with the free end of the pawl 163, as may be observed with reference to Fig. XV. Said circumferential flange 170 merely serves to separate the free ends of said pawls 162 and 163 as indicated in Figs. XIII and XV so as to prevent them from interfering with each other.

Said shaft 139 turns counterclockwise in Fig. XV and with the effect that at the completion of each revolution of said shaft 139 which corresponds with each revolution of the cents dials 125 and 145, said pawl 162 is first tripped, by the tappet 168, to permit the shaft 115 and its ratchet 156 to turn the slight angular extent from engagement with the pawl 162 to engagement with the pawl 163; so that the pawl 162 is replaced in contact with the ratchet 156 past the crest of the tooth of said ratchet caught by said pawl 163. Thereupon, the pawl 163 is tripped, by the tappet 169, so as to permit said shaft 115 and ratchet 156 to turn the angular extent from one of the ratchet teeth to the next, which is stopped against the end of said pawl 162, in the position shown in Fig. XV, thus advancing said dollars dials 116 and 117 the extent of one dollar for each revolution of said cents dials 125 and 145.

To permit the setting back of said dials to the zero position, I provide said shaft 139 with the loose clutch sleeve 177 shown in Fig. XXI, which, as shown in Fig. XIII, has the diametrical projection 177' extending in the larger recess 178 in the hub 178' of the gear 179. Said gear hub and sleeve are encircled by the spring 179', respectively connected therewith at its opposite ends and stressed so that said gear 179 is continually subjected to torque on said sleeve counterclockwise in Fig. VII, to afford sufficient loss of motion to insure that more than one tooth of the sectoral gear 239 shall be in mesh with said gear 179 before the latter encounters said projection 177 and the load to be set back. Said sleeve 177 is loose upon said shaft but continually frictionally engaged therewith by means of the friction disks 180 interposed between said sleeve and the flanged disk 181 which is rigidly connected with said shaft. Such frictional engagement is caused by the spring 182 between said sleeve 177 and the collar 183 encircling said shaft. Said collar is adjustably secured on said shaft by the set screw 184 so that the frictional engagement of said gear 179 with said shaft 139 shall be sufficient to overcome the frictional engagement of the spring 122 upon the registering mechanism driving gear 113 during the resetting operation. However, before describing said resetting operation, I will describe the volume indicating and registering mechanism which is adapted to be reset to zero position by the same means.

Referring to Fig. IV, said tubular shaft 44 which is turned one revolution for each gallon of the liquid dispensed through the meter 19 and carries the series of nine cams including those marked 97, 98, and 99, is frictionally engaged with the shaft 45 which it encircles, by the friction disks 186 interposed between said cam 99 and the collar 187 which is pinned on said shaft. Said disks are pressed by the spring 188 which, as shown in Fig. IV, is interposed between the right hand end of said tubular shaft 44 and the loose sleeve 189 which encircles the shaft 45 and abuts against the gear 190 fixed on said shaft 45 and by which it may be set back, as hereinafter described. Said shaft 45 has fixed upon its respectively opposite ends the oppositely counterpart fractional gallon dials 192 and 193; the dial 192 being shown in Figs. II and III. Each of said dials has a circular series of ten numerals thereon respectively 1/10 to 9/10 which represent tenths of a gallon, and zero representing the whole gallon. Said dials are normally turned by such frictional connection of said shaft 45 with the gear 43 shown in Fig. IV in mesh with the gear 42 driven by the shaft 31 of the meter 19, to indicate and register fractions of a gallon dispensed. Such frictional engagement of said shaft 45 with the tubular shaft 44 which normally drives it, is merely to permit said shaft 45 to be set back to present said dial 192 in zero position at the window 194 and with respect to the index pointer 194' in said panel 70, and the dial 193 at the corresponding window in said panel 146, while the shaft 44 is held stationary by its connection with the meter 19.

The whole gallons dials 195 and 196 are respectively journaled upon the hubs of said fractional dials 192 and 193 as shown in Fig. IV, and prevented from axial displacement thereon by the collar 197 and the hub 198 of the tappet cam 199 which are fixed upon the shaft 45 by the pins securing said dial hubs. Dials 195 and 196 have oppositely counterpart circular series of twenty numbers thereon from 1 to 0 representing twenty gallons, the zero also representing the initial position of the dials. As said dials 195 and 196 are turned, the numbers thereon are respectively presented at said window 194 in the panel 70 and at the corresponding window in the panel 146. To turn them, I provide said dials 195 and 196 with respective gears 200 and 201 in mesh with respective gears 202 and 203 on the gallons dials connecting shaft 204, as shown in Fig. V. As shown in Figs. V and XXI, said shaft 204 is journaled in said opposite end plates 35 and 36 and the intermediate plate 49 of the computer housing; endwise movement of said shaft being prevented by the hub of said gear 202 and the collar 205 opposed thereto upon the inner face of the wall 35 and pinned to said shaft, as shown in Fig. XXI. Said tappet cam 199 carried by said shaft 45 of the fractional gallon dials 192 and 193 makes one revolution for each gallon dispensed through the meter 19, and as shown in dotted lines in Fig. VII, is in effect a gear with a single tooth adapted to successively engage the ten teeth on the star wheel 207 shown at the left hand end of said shaft 204 in Fig. XXI conveniently in unitary relation with said gear 203. The relation of said tappet cam 199 and said star wheel 207 is such that at each revolution of said fractional gallon dials said shaft 204 is turned 1/10 of a revolution and turns said gallons dials 195 and 196 1/20 of a revolution to register and indicate dispensation of a gallon. Said dials are detained in each position to which they are thus shifted by respective rollers 208, indicated in Figs. III, IV, and VII, carried by levers 208' fulcrumed on the studs 35' and 36' (respectively projecting from the housing wall plates 35 and 36) and pressed toward said gears by respective springs 208'' which encircle the hubs of said levers and each having one end engaged with its lever and the other with its supporting plate.

Said registering and indicating mechanism is arranged to be set back to zero position by clockwise rotation of the crank 209 shown in Fig. VIII extending exterior to the upper casing section 7. Said crank is operatively connected with the set-back shaft 210 extending through said casing section 7 and journaled at its outer end in the bearing 211 in the cross bar 212 which is detachably rigidly connected with the lock casing 213. The inner end of said set-back shaft 210 is journaled in the bearing 214 in said casing 213 and provided with the cross pin 215 engaging the slightly loose coupling 216 which has the slot 217 engaging the cross pin 218 on the shaft 219 which is journaled in said housing side wall 38 and the pocket shaped bracket 38' which is in unitary relation therewith, as shown in Fig. V. Said shaft 219 carries the bevel gear 220 engaging the bevel gear 221 on the shaft 222 which extends parallel with said shaft 204 and is journaled in said bracket 38' and in the bracket 38'' on said plate 38. Said shaft 222 carries the gear 223, the right hand end of which, as shown in Fig. V, engages the gear 224 which is journaled to turn loosely on the stationary shaft 225 which is fixed in the bearings 226 which are in unitary relation with said wall plate 38, as shown in Figs. V and XXI. Said gear 224 is in unitary relation with the gear 227 which, during the set-back operation, engages the gear 228 which, as shown in Figs. V and XXI, has its hub provided with the diametrical recess 228' for engagement with the smaller diametrical projection 228'' on the loose clutch sleeve 228ᵃ. Said gear hub and sleeve are encircled by the spring 228ᵇ respectively connected therewith at its opposite ends and stressed so that said gear 228 is continually subjected to torque on said sleeve 228ᵃ counterclockwise in Fig. VII, to afford sufficient loss of motion to insure that more than one tooth of the sectoral gear 227 shall be in mesh with said gear 228 before the latter encounters said projection 228'' and the load to be set back. Said sleeve 228ᵃ is frictionally engaged with said tubular shaft 229 by the friction disks 232 extending between the hub of said gear 228 and the gear 233, (which latter is pinned to said shaft 229, as shown in Fig. XXI), under pressure of the spring 234 compressed between said gear 228 and the abutment collar 235 fixed on said shaft 229. However, as indicated in Fig. XXII, said gear 227 is devoid of teeth throughout its sector 227' which registers with said gear 228 when the indicating mechanism is in zero position, so that the set-back mechanism is not turned by the normal operation of the volume registering indicating mechanism. Said gear 233 which is at the left in Fig. XXI is in mesh with said gear 190 on the shaft 45 at the right in Fig. IV so that rotation of said set-back crank 209 clockwise with reference to Fig. VIII turns said shaft 45 and the volume indicating dials 192, 193, 195, and 196 clockwise with reference to Fig. II to reset them to zero position while the tubular shaft 44 shown in Fig. IV encircling said shaft 45 remains stationary in its connection with the meter mechanism; the friction disks 186 slipping during said setting back operation despite the pressure of the spring 188. Said dials 195 and 196 are stopped in zero position by the one tooth ratchet 201' shown in Figs. IV and VII which is rigidly connected with said gear 201 and adapted to be then caught by the gravity hook latch 201'' which is fulcrumed on the stud 36'' projecting from the housing plate 36. Said latch is merely idly lifted by the normal rotation of said ratchet 201', clockwise in Fig. VII.

The operation of said set-back mechanism by the crank 209 as above described also effects the return of the value indicating dials 116, 117, 125, and 145 to their zero position by the following means: Referring to Figs. XXI and XXII, said gear 223 is also in mesh with the gear 236 which is journaled to turn loosely on the stationary shaft 237 which is fixed in the bearings 238 which are in unitary relation with said wall plate 38, as shown in Fig. XXI. Said gear 236 is in unitary relation with the gear 239 which, during the set-back operation, engages the gear 179 which as above described is frictionally engaged with the shaft 139 by the spring 182, as shown in Figs. XIII and XXI. However, as indicated in Fig. XXII, said gear 239 is devoid of teeth throughout its sector 239' which registers with said gear 179 when the indicating mechanism is in zero position so that the set-back mechanism is not turned by the normal operation of the computing registering indicating mechanism. The connections between said shaft 139 and the cents value indicating dials 125 and 145 above described with reference to Figs. IV and XIII are such that the setting back operation aforesaid returns those dials to their zero position by their respective gears 128 and 141 by clockwise rotation of said dials with reference to Figs. II and III and independently of the shaft 115 which carries the dollars value indicating dials.

However, it is to be understood that any suitable power multiplying gearing may be employed between the crank 209 and the indicating dials aforesaid to facilitate resetting the latter to zero position.

As shown in Fig. XVI, said shaft 115 has rigidly fixed thereon within the hub 142 of said dial 145 the single toothed ratchet 240 shown in Figs. IV and XVI, and said hub carries the pin pawl 241 continually pressed toward said ratchet by the spring 242 which is fixed at one end to said hub so that when said dials 125 and 145 are restored to zero position, said pawl and ratchet are in the position shown in Fig. XVI. Moreover, said shaft 139 is provided with the single toothed ratchet 244 rigidly connected therewith by the set screw 245, as shown in Figs. XIII and XIV so that when the dials have been restored to zero position, said ratchet is engaged by the pawl 246 which, as shown in said Figs. XIII and XIV, is fulcrumed on said stud 158 upon the side of said intermediate housing plate 49 opposite the lever 157; so that the sectoral gear 161 which has been turned clockwise in Fig. XIV to wind the spring 155 by engagement with the pinion 160 fixed on the shaft 115 cannot be accidentally turned out of engagement with said pinion. However, the first dispensing operation thereafter which permits escapement of said spring to turn the dollars dials 116 and 117 as above described, causes said pinion 160 to turn the sectoral gear 161 counter-clockwise in Fig. XIV and so that the cam crest 247 on said gear 161 which is engaged with the stud 248 on said pawl 246 in the zero position shown in Fig. XIV, thrusts said pawl, by said stud, out of engagement with said ratchet 244 so that said stud is received into the notch 249 in said gear 161 during the further escapement of said spring 155, but such movement is limited by the encounter of the stud 248 with the inner end of that notch so that said gear 161 is not disengaged from the pinion 160 by movement in that direction. It is to be understood that said spring 155 is thus rewound to its normal initial tension by each resetting operation and only to the extent which it has become unwound by escapement consequent upon the dispensation of liquid at each dispensing operation.

As indicated in Figs. VIII, XIX, and XX, said set-back shaft 210, arranged to be operated by the crank 209 as above described, is provided with means operatively connecting it with the hose hook lever 25, including the lever 250 fulcrumed at 251 in said lock casing 213 and pivotally connected with said lever 25 by the link 252; the arrangement being such that said hose hook lever 25 cannot be operated to close the switch 29 to start a liquid dispensing operation unless and until said computing registering indicating mechanism is restored to its zero position. However, the specific construction of that interlocking mechanism shown in Figs. VIII, XIX, and XX is the subject matter of my copending application (82-34) Serial No. 754,201 filed November 22, 1934, and therefore will not be further described herein.

As above noted; the numbers on the price display dials 60 and 80 are manually selected for presentation at the window 69 in the panel 70 shown in Fig. II to manifest the price per gallon at which the computing apparatus is set to compute the amount of sale at each dispensing operation. I find it preferable to provide dials 253 and 254 which are respectively oppositely counterpart to said dials 60 and 80 to display the same price with respect to a window 255 in the panel 146 at the opposite side of the machine. As shown in Fig. V, the hub 256 of said dial 253 is journaled upon the stud 257 which is fixed in the housing wall plate 36 and said dial prevented from axial displacement by the screw 257' engaging said stud. Said hub 256 of the dial 253 has, upon the inner end thereof, the gear 258 by which said dial 253 is turned in precise accordance with the turning movement of said dial 60 by the means hereinafter described. As shown in Fig. V, said dial 254 has its hub 259 loosely journaled on said hub 256 of the dial 253 and provided at its inner end with the gear 260 which is separated from said gear 258 by the loose ring 261 in coaxial relation with both of said dial hubs. As shown in Figs. V and VII, said gear 260 is in mesh with the sectoral gear 263 for transversely connecting said dial 254 with the dial 80. Said gear 263 is mounted to oscillate upon the stud 264 which, as shown in Fig. V, is rigidly secured in the housing wall plate 36 by the nut 265. At its opposite side, said gear 263 is in mesh with the gear 266 which is loosely journaled on the shaft 68 which is rigidly connected with the interlocking sleeve 58 having the series of recesses in its circumference axially spaced with respect thereto as above described and as indicated in Figs. V and VI. Said gear 266 is loosely retained upon said shaft 68 by the screw 267 and washer 268 and is in mesh with the gear 269 fixed on the counter shaft 271 which extends parallel with said shaft 68 and is journaled in the bearings 272 and 273 respectively in said housing wall plates 36 and 49, as shown in Fig. VI. Said counter shaft 271 has, rigidly connected therewith, adjoining said frame plate 49, the gear 274 in mesh with the gear 275 conveniently formed in unitary relation with the interlocking sleeve 79 which, as above described and shown in Fig. V, is rigidly connected with the dial 80. The arrangement is such that when said dial 80 is manually turned, conveniently by manipulation of said sleeve 79, to display the fractional cent of the current price at the window 69, as shown in Fig. II where ".3" is displayed, the oppositely counterpart dial 254 is turned to display the same price at the window 255 in the panel 146. The spring 92 shown in Fig. VI interposed between the left hand end of said sleeve 58 and the right hand end of said sleeve 79, imposes a desirable amount of friction to the freedom of turning movement of said sleeve 79, to facilitate the manipulation of the latter and hold said sleeves in their proper relation with their respective detent devices shown in Fig. VI.

Referring to Figs. V and VII; the sectoral gear 278, which is precisely like said gear 263, is mounted to oscillate upon the same stud 264 to connect said gear 258 on the hub of the dial 253 with the gear 279 which is conveniently formed in unitary relation with the end of said interlocking sleeve 58, so that rotation of said dial 60 by manipulation of said sleeve 58 which is rigidly connected with the shaft 68 of that dial, effects corresponding rotation of the dial 253 to present the same selected cents price number upon said dial 60 at the window 69 (where the number "17" is displayed in Fig. II) and upon said dial 253 at the window 255 in the panel 146.

As shown in Fig. VII, the housing plate 36 is provided with two stop lugs 280 projecting therefrom so as to be encountered by both of said sectoral connecting gears 263 and 278 merely to prevent accidental excess movement of either of said sectoral gears.

I find it convenient to provide each of said windows 69 and 255 with a pane of plane glass 282 backed by a lens 283 which is a segment of a cylinder having its axis extending in a horizontal plane so as to magnify the small price displayed numerals "17.3" to appear larger than their actual size shown in Fig. II.

Referring to Figs. III, IX, X, and XXIII, the housing wall plate 37 has two openings near its upper edge to receive the dowel studs 285 and 286 projecting from the top wall plate 39 so as to precisely locate said plate 37 upon the housing. Said plate 37 is secured in closed position by the screw 287 which engages in a threaded socket in the flange 49' on the adjacent edge of the intermediate wall plate 49. Said screw has the milled head 288 projecting exterior to said plate 37 for convenient manipulation by the operator. However, in order to secure said plate 37 upon the housing so that it cannot be removed by any unauthorized person, I provide said plate with the lock 290, conveniently of the pin tumbler type, and controllable by a key inserted in the hole 291 to rotate the lock barrel 292, indicated in dotted lines in Fig. III, which carries the radial arm 293 which in locked position overlaps and engages the inner face of said flange 49'.

When in the closed position shown, said removable housing plate 37 not only secludes the price displaying and value computing mechanism interlocking means shown in Figs. IX and X from any unauthorized change in their relationship, but said plate 37 includes the horizontally extending portion 37' which overhangs the blade 57 as shown in Fig. IX, so as to prevent accidental displacement of said blade from the recess in the interlocking sleeve 58 in which it has been placed. Moreover, said plate 37 has the portion 37" extending vertically in such proximity to the blade 94 that the latter cannot be accidentally removed from the recess in the circumference of the interlocking sleeve 79 to which it has been adjusted.

As shown in Fig. XXIII, said plate 37 has the window 294 through which the operator may observe the numbers upon the totalizer registering mechanism 295 including a series of five wheels each having numbers from 1 to 9 and 0 on its circumference. Said wheels are mounted to rotate in the frame 296 shown in Fig. V which is conveniently formed in unitary relation with the bearing bracket 41 in which the shaft 33 is journaled, as above described. The unit wheel 297, shown at the left in Fig. V and at the right in Fig. XXIII, is rigidly connected with the gear 298 shown in Fig. V in mesh with said gear 47 by which the conical assemblage of gears of different sizes on the shaft 48 is turned; so that as said shaft 48 is turned one revolution for each gallon of liquid dispensed, said totalizer registering mechanism is advanced to show the addition of one gallon so that the total volume of liquid dispensed is registered and indicated at said window 294 in the plate 37 shown in Fig. XXIII.

Said housing plate 37 also has the window 299 through which the operator may observe the numbers upon the totalizer registering mechanism 300 including a series of five wheels each having numbers from 1 to 9 and 0 on its circumference. Said wheels are mounted to rotate in the frame 301 which, as shown in Fig. IV, is rigidly connected with the top wall plate 39 of the housing. The unit wheel 302 which indicates cents and which is shown at the left in Fig. IV and at the right in Fig. XXIII, is rigidly connected with the gear 303 shown in Fig. IV and indicated in dotted lines in Fig. III. Said gear 303 is in mesh with said gear 113 shown in Fig. IV so that as gear 113 is turned to operate the value computing dials 116, 117, 125, and 145, as above described, to register and indicate the value of liquid dispensed at each dispensing operation, that value is added to the total shown by said totalizer registering mechanism 300. It may be observed that the operation of setting back said dials to their zero position at the end of each dispensing operation does not set-back the gear 113 which is then held stationary by its connection with the meter mechanism and, consequently, said totalizer 300 is not set-back but manifests at all times through the window 299 the total amount of dollars and cents value of liquid dispensed through the apparatus with which said computing registering indicating mechanism is operatively connected as shown in Fig. I.

Each of said display panels 70 and 146 has a group of four holes therethrough respectively 305, 306, 307, and 308 located with respect to the axes of rotation of the number indicating dials, as shown in Fig. II. Said panels are provided with respective slide covers 309 for said holes which are secured to the panels by studs 310 extending through slots 311 in the covers which are normally closed over said holes, as indicated in Fig. II. Said holes are provided to facilitate the precise positioning of said indicating dials with respect to said panels and the means for supporting and rotating the dials. The holes 305, when uncovered, permit the insertion of a screw driver to engage the respective circular series of three screws 313 by which the cents value dials 125 and 145 are secured upon the means for rotating them, said screws being extended through arcuate slots 314 in said dials and registered with respective holes 315 in the dollars value dials 116 and 117. The holes 306 in said panels similarly afford access to the respective circular series of three screws 316 by which the respective dollars value dials 116 and 117 are secured upon the means for rotating them; said screws 316 being extended through arcuate slots 317 in the latter dials. The holes 307 in said panels 70 and 146 similarly afford access to the respective circular series of three screws 319 by which the whole gallon dials 195 and 196 are secured upon the means for rotating them, said screws being extended through arcuate slots 320 in said dials and registered with respective holes 321 in the fractional gallon dials 192 and 193. The holes 308 in said panels similarly afford access to the respective circular series of three screws 322 by which the respective fractional gallon dials 192 and 193 are secured upon the means for rotating them; said screws 322 being extended through arcuate slots 323 in the latter dials. However, it is to be understood that the several indicating dials aforesaid may be otherwise secured upon the means for rotating them.

Although I have found it convenient to progress the dollars dials 116 and 117 step by step, as above described, by means of the spring 155 and the escapement ratchet 156 and its appurtenances; the construction and arrangement may be simplified by connecting said dials with the cents dials 125 and 145 by gearing actuated by turning movement of the latter dials, as in the modified form of my invention shown in Figs. XXIV, XXV, and XXVI. In said figures, the shaft 115 which carries said dollar dials also carries the gear 325 which is continually frictionally engaged therewith by the spring 326 set in a recess in said shaft so that the latter is normally turned by and with said gear, but the shaft and dollar dials may be set back as above described, to wit, by the sectoral gear 161 which engages the pinion 160 on said shaft. Said gear 325 has forty teeth engaging the sixteen teeth of the pinion 327 which is loosely journaled on the shaft 328 in the bearing bracket 329 which is rigidly secured to the top plate 39 of the housing. Said pinion has the circumferential web 327' overlapping the edge of said gear 325 and maintaining said pinion in proper relation with it and the gear 330 which is tightly fitted on said sleeve 118 connected with the cents dials 125 and 145 as above described. Said gear 330 has but four teeth which are adapted to engage said sixteen teeth of the pinion 327 upon the side of said flange 328 opposite to the gear 325 so that each revolution of said cents dials turns said gear 330 and causes the latter to turn said pinion 327 one-fourth revolution. At the left hand end of said pinion 327 in Fig. XXIV, conveniently formed in unitary relation with said pinion 327, is a pinion 331 having but four teeth, equally spaced circumferentially and conveniently extensions of teeth of said pinion 327. The arrangement is such that each quarter turn of said pinion 327 by a revolution of said cents dial gear 330 turns said gear 325 and dollars dials 116 and 117 one-tenth revolution, and leaves two of the four teeth of said pinion 331 bearing upon the cylindrical perimeter 332 of said gear 330 and serving as a stop securely holding said pinion 327 and said gear 325 and dials from further turning movement until the completion of the next revolution of said cents dials 125 and 145 and said gear 330. Consequently, upon each revolution of the cents dials 125 and 145, said dollar dials 116 and 117 are advanced the angular extent from one dollar number to the next and securely held in the advanced position unless and until all the dials 116, 117, 125 and 145 are reset to their initial zero position. However, it is to be understood that any suitable means may be employed for effecting the actuation of the dollar dials in proper correlation with the cents dials.

Moreover, although in the form of my invention chosen for illustration I have found it convenient to mount the price dials 60 and 80 in coaxial relation with the cylindrical recessed rotary members 58 and 79, such relation is not essential as it is merely necessary to have the respective cylindrical recessed members connected to turn with the dials which respectively indicate their position of adjustment. It is obvious that such connection may be effected with the cylindrical members on axes parallel with but spaced from the axes of their respective dials, in which case each dial may be connected by gearing with its respective cylindrical recessed member.

Therefore, I do not desire to limit myself to the precise details of construction and arrangement herein set forth, as it is obvious that various modifications may be made therein without departing from the essential features of my invention, as defined in the appended claims.

I claim:

1. In a computing registering mechanism the combination with a rotary dial carrying a circular series of numbers; of a cylindrical rotary member, connected to turn with said dial and having recesses in its circumference, spaced both circumferentially, in correspondence with the numbers on said dial, and longitudinally with respect to its axis; and interlocking means including a movable member which is manually adjustable axially with respect to said recessed member and transversely with respect to said recessed member, to be engaged selectively with the one of said recesses presented in registry therewith in accordance with the rotary position of said dial and recessed member; whereby any recess presented in position to be engaged by said movable member corresponds with the numerical factor displayed by said dial.

2. In computing registering mechanism, the combination with a series of gears of different sizes in coaxial relation; of a pinion parallel with said series of gears; a selector gear having means continually holding it in mesh with said pinion and comprising a frame capable of being rocked on the axis of said pinion toward and away from said series of gears, for selective engagement of said selector gear with any one of said series of gears of different sizes; interlocking means for detaining said selector gear in selected position including a blade on said frame, and a cylindrical rotary member having recesses in its circumference, spaced both circumferentially and longitudinally with respect to its axis, for selective engagement with said blade; a rotary dial carrying a circular series of numbers, and connected to turn with said cylindrical rotary member; the numbers on said dial corresponding with the recesses in said cylindrical member; whereby, any recess presented in position to be engaged by said blade, corresponds with the numerical factor displayed by said dial.

3. In computing registering mechanism, the combination with a series of cams in coaxial relation and having respectively different numbers of crests; of a selector lever for cooperation with any one of said cams, and carrying a blade; interlocking means for detaining said lever in cooperative relation with the cam selected, including a cylindrical rotary member, having recesses in its circumference, spaced both circumferentially and longitudinally with respect to its axis, to be selectively engaged with said blade when presented in registry therewith; and a rotary dial carrying a circular series of numbers, and connected to turn with said cylindrical rotary member; the numbers on said dial corresponding with the recesses in said cylindrical member; whereby, any recess presented in position to be engaged by said blade corresponds with the numerical factor displayed by said dial.

4. Mechanism as in claim 3; wherein the selector lever is fulcrumed on a screw shaft and may be shifted longitudinally with respect to its axis by rotation of said shaft.

JOSEPH C. WOODFORD.